July 28, 1925.

D. G. SMYTH

METER STICK ATTACHMENT

Filed Jan. 26, 1925

1,547,625

INVENTOR.
David G. Smyth
BY
Harry P. Williams
ATTORNEY

Patented July 28, 1925.

1,547,625

UNITED STATES PATENT OFFICE.

DAVID G. SMYTH, OF HARTFORD, CONNECTICUT.

METER-STICK ATTACHMENT.

Application filed January 26, 1925. Serial No. 4,741.

*To all whom it may concern:*

Be it known that I, DAVID G. SMYTH, a citizen of the United States, residing at Hartford, in the county of Hartford and State of Connecticut, have invented a new and useful Improvement in Meter-Stick Attachments, of which the following is a specification.

Instructors in elementary physics are, during their courses, required to expound to their pupils the principles of leverage. This invention relates to a device which is designed to be movably applied to a meter stick or similar graduated measuring bar for the purpose of ocularly demonstrating the laws of the lever.

The object of the invention is to provide a simple, inexpensive article which may be readily applied by anyone to a meter stick or graduated measuring bar and adjusted thereon from graduation to graduation so as to illustrate with facility and accuracy the leverage problem under discussion.

In carrying out this invention a frame or casing that is adapted to be thrust upon and slipped along a meter stick or bar is provided with a fulcrum which will extend transversely of the stick to which the frame is applied, the frame having a pointer or index finger designed to register with the graduations on the stick and also having means which will yieldingly grasp the stick and prevent accidental movement of the device from the desired position to which it is adjusted.

Figure 1:
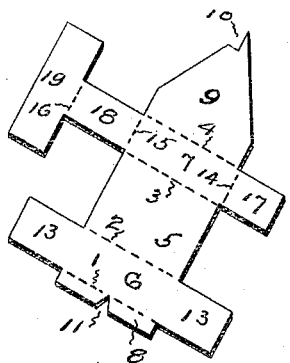
Figure 2:
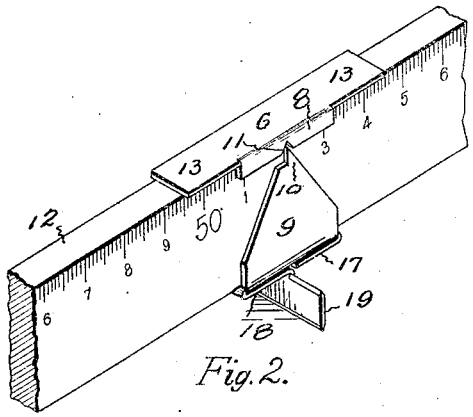
Figure 3:
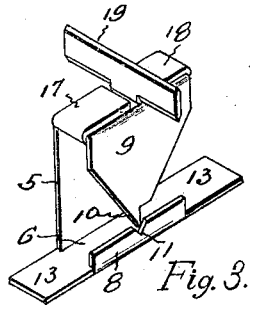

In the accompanying drawings which illustrate an embodiment of the invention, Fig. 1 shows a perspective view of a blank of sheet metal from which the article may be formed. Fig. 2 illustrates one of the devices applied to a meter stick with the fulcrum below the center of gravity. Fig. 3 shows the device reversed, as when it is used with the fulcrum above the center of gravity.

The complete device may, if desired, be bent to shape from a punching of sheet metal or other material having the outline illustrated in Fig. 1, but of course, it need not be made in one piece. In the preferred form shown the blank is bent to produce the tubular frame or casing on the dotted lines 1, 2, 3 and 4, the section 5 forming the back wall, the section 6 forming the top wall, the section 7 forming the bottom wall, the section 8 forming part of the front wall, and the section 9 forming another part of the front wall of the frame or casing. The front wall section 9 is tapered and the point end cut to provide an index finger or straight edge pointer 10, and the front wall section 8 has a notch 11 to expose the graduations on the meter stick adjacent to the pointer. When the blank is bent in this way a casing is formed which may be slipped upon and slid along a meter stick 12. The wings 13 of the top section 6 are desirably slightly sprung so as to tension against the top of the stick with such pressure as will prevent any accidental or inadvertent displacement of the device along the stick after it has been located in the desired position for the particular demonstration at hand.

The bottom section 7 is bent upon the dotted lines 14, 15 and 16, the sections 17 and 18 being bent over against the outside of the bottom section 7, and the section 19 being bent outward to produce the knife edge fulcrum.

This structure may be readily slipped upon a meter stick and easily moved from place to place and retained in the position to which it is adjusted, the pointer registering with the graduations and its straight edge being in the plane of the fulcrum instantly gives a visual indication of the relation of the fulcrum to the zero end of the stick. This produces a device which is particularly serviceable for use by instructors for demonstrating the principles of leverage with facility and accuracy. The device may be used with the fulcrum below the center of gravity, as shown in Fig. 2, by resting the fulcrum upon any suitable horizontal surface, or it may be used in an inverted position, as shown in Fig. 3, in which case the fulcrum is made to rest upon any suitable support or suspension.

The invention claimed is:—

1. An attachment for meter sticks comprising a frame adapted to be slipped upon and slide along such a stick, and a fulcrum extending from the lower edge of the frame at right angles to the opening through the frame.

2. An attachment for meter sticks comprising a frame adapted to be slipped upon and slide along such a stick, a fulcrum extending from one side of the frame, and a pointer in the plane of the fulcrum and adapted to register with the graduations of the stick to which the device is applied.

3. An attachment for meter sticks comprising a frame having an opening adapted to receive such a stick, a fulcrum extending from one side of the frame, a pointer in the plane of the fulcrum adapted to register with the meter stick graduations, and yielding means adapted to provide a tension and prevent the inadvertent movement of the attachment on the meter stick to which it is applied.

4. An attachment for meter sticks formed from a single piece of metal bent to shape and having a fulcrum extending from one wall and an index pointer extending from another wall.

5. An attachment for meter sticks formed from a single piece of metal bent to shape and having a fulcrum extending across the bottom, an index pointer extending on the front and yielding tension wings on the top.

DAVID G. SMYTH.